Oct. 4, 1938.                R. W. LEDRICH                2,131,858
                      NONCOCKING FISHING SPINNER
                         Filed May 19, 1936
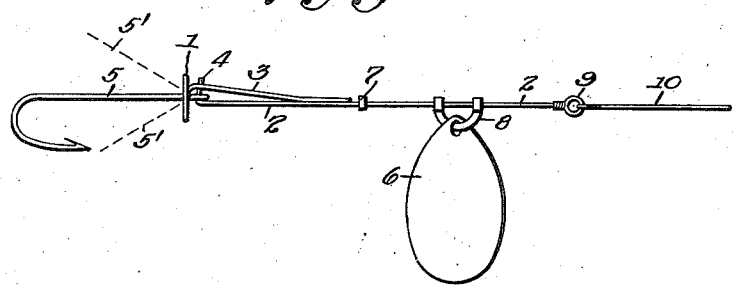
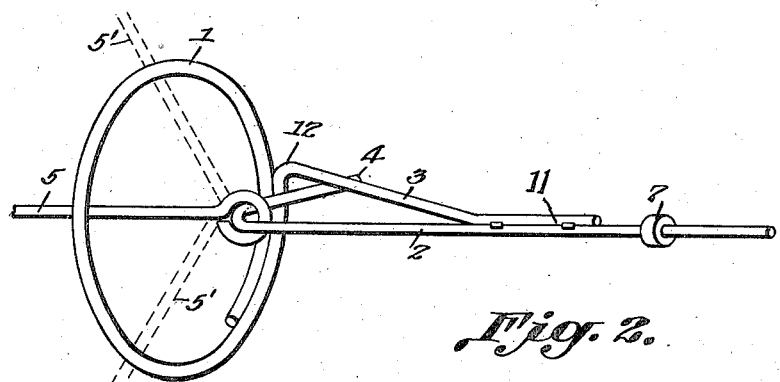
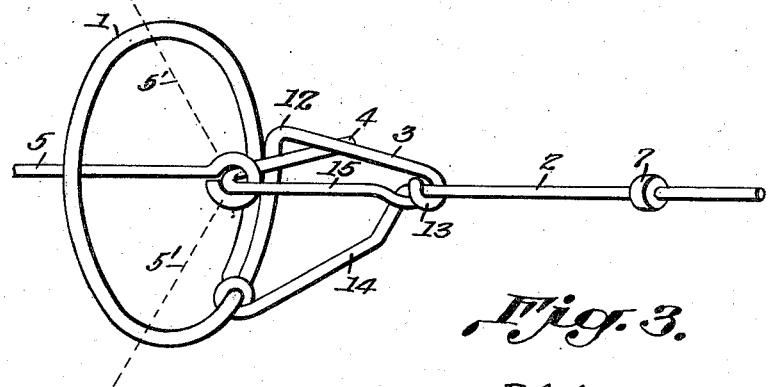
Robert W. Ledrich, Inventor
By N. S. Armstedt, Attorney Patented Oct. 4, 1938

2,131,858

UNITED STATES PATENT OFFICE 2,131,858

NONCOCKING FISHING SPINNER

Robert W. Ledrich, Cuyahoga Falls, Ohio

Application May 19, 1936, Serial No. 80,621

5 Claims. (Cl. 43—28)

My invention relates to improvements in noncocking fishing spinners and it more especially relates to the features pointed out in the annexed claims.

The purpose of my invention is to provide a fish spinner that cannot become entangled with an associated bait or fly; that is simple in construction and efficient in operation; and that is free from the complexities associated with previous attempts in making spinners free from interference with the bait or fly.

With these and other ends in view I illustrate in the accompanying drawing such instances of adaptation as will illustrate the broad features of the invention without limiting myself to the specific details shown thereon and described herein.

Fig. 1 is an elevation of the non-cocking feature associated with a spinner and its attached line.

Fig. 2 is an enlarged perspective view of a non-cocking loop that encircles the eye of the hook.

Fig. 3 is a perspective view similar to Fig. 2 showing the device made of a single piece of wire.

In practicing my invention I may use whatever alternatives or equivalents of construction the exigencies of varying conditions may demand without departing from the broad spirit of the invention.

A guard 1 is formed in substantially circular shape, as shown in Fig. 2 of suitable wire. It assumes the form of a spiral loop. At this point where the turns overlap at 12 an angular bend 3 is made. This terminates in a straight portion 11 that is secured to the portion 2 which carries the spinner 6 between a collar 7 and an eye 9 to which the casting line 10 is attached. The spinner 6 is attached to the clevis 8 for free movement thereon and free rotation with the clevis around the portion 2.

The straight portions 2 and 11 may be secured to each other in any desired manner by spot welding, soldering, encoiling with wire etc. The straight portion 2 terminates in front of and approximately in the center of the loop 1. At this point a sharp bend at approximately right angles (Fig. 1) is made to form the fastening 4. This part passes through the eye of the hook 5 and by its own spring tension it is held against the underside of the part 3 so that the hook 5 cannot become disengaged accidentally. To assemble a hook or fly the end 4 is moved away from the part 3 just far enough to permit the eye to pass beneath the safeguard 3 when the hook end 4 by reason of the elasticity of the wire causes the part 4 to spring against the safeguard. A line 10 attached to the usual reel completes the outfit.

The dotted lines 5' on Figs. 1 and 2 indicate the angular limits that the hook or fly can take. This can never interfere with the spinner. The distance between the collar 7 and the loop 1 is such that in any rearward position of the spinner 6 it cannot reach the hook 5 which is limited in its angular positions by the loop 1.

By reason of the loop 1 and the extension 4 the hook can only move angularly in one direction as far as the radius of the loop 1 will permit. In this way the fisherman is freed from the annoyance of having the hook becoming entangled with the spinner. If such a situation arises the efficacy of the spinner is lost entirely. All of these advantages are secured without the use of any sliding parts whatever.

Should it be found desirable to form my device of a single piece of wire instead of the separate pieces 1 and 2 as shown in Fig. 2, this may be done without departing from the broad spirit of the invention. As there are many different ways in which such an adaptation may be accomplished, it is apparent that whatever expedient is followed the retention of the eye of the hook 5 or an equivalent fly is accomplished through the cooperation between a catch 4 and a safeguard 3, for instance, as suggested in Fig. 3, wherein the main member 2 is offset at 14 from where it is continued to form the loop 1. On completing one turn, it is bent at 12 to form the safeguard 3, which is twisted around the member 2 at 13, to form an extension 15, which terminates in the catch 4 to which the hook 5 is attached, as in Fig. 2.

What I claim is:—

1. A non-cocking lure comprising a relatively straight member for attachment to a line having an elastic catch adapted to receive the eye of a hook or fly said catch being short and bent approximately at right angles to said member, a loop surrounding the eye of the hook adjacent to the catch, an extension from the loop engaging the catch and extending alongside and being rigidly secured to the straight member to which it is attached, a line securing means at the free end of the straight member, a spinner on such member, and means for limiting the extent of movement of the spinner.

2. A non-cocking lure, comprising a relatively straight line member, a spinner on the member free to traverse lengthwise and to rotate thereon, an elastic catch bent approximately at right angles formed at one end of the line member spaced apart from the extreme traverse of the spinner, a hook or fly having an eye through which the catch projects, a loop for preventing the jamming of the hook and spinner surrounding the eye adjacent to the catch, and an extension from the loop cooperating with the catch to prevent the detachment of the hook, said extension being rigidly secured to the line member between the catch and the spinner.

3. A device of the character described comprising a relatively straight line member, a short catch bent approximately at right angles at one end of the member, a line securing means at the other end of said member, a hook having an eye through which the catch projects, a loop encircling the eye of the hook positioned adjacent the catch, and an extension from the loop rigidly secured to the line member, said extension cooperating with the catch to prevent the disengagement of the hook.

4. A fishing lure, comprising a line member, a spinner thereon, a relatively straight catch bent at one end of said member, a hook having its eye attached to and free to move on the catch within prescribed limits, a side extension rigidly attached to the line member passing across the catch and in engagement therewith, and a loop formed on the extension adjacent the catch and surrounding the eye of the hook thereby adapted to limit the movement of the hook on the catch.

5. A fishing lure comprising a bait hook or fly having an eye, a thin wire line member having a short catch bent approximately at right angles at one end of the member, a thin wire loop encircling the hook adjacent its eye, an extension of the loop passing across the catch and in engagement therewith, said extension forming a part of the line member by being rigid therewith to constitute a unitary structure, a spinner on the line member, means on the line member to limit the traverse of the spinner, and line attaching means at the outer end of said member.

ROBERT W. LEDRICH.